(12) United States Patent
Okahara et al.

(10) Patent No.: US 7,309,221 B2
(45) Date of Patent: Dec. 18, 2007

(54) INTERNALLY COATED MOLD, AND INTERNAL MOLD COATING FORMING METHOD

(75) Inventors: Etsuo Okahara, Ube (JP); Toshio Arai, Ube (JP); Takashi Okusako, Ube (JP); Kazuaki Kobayashi, Yoshiki-gun (JP)

(73) Assignee: Ube Machinery Corporation, Ltd., Ube-shi (JP)

( * ) Notice: Subject to any disclaimer, the term of this patent is extended or adjusted under 35 U.S.C. 154(b) by 352 days.

(21) Appl. No.: 10/483,263

(22) PCT Filed: Jul. 23, 2002

(86) PCT No.: PCT/JP02/07419

§ 371 (c)(1),
(2), (4) Date: Jan. 14, 2004

(87) PCT Pub. No.: WO03/009985

PCT Pub. Date: Feb. 6, 2003

(65) Prior Publication Data

US 2004/0201132 A1    Oct. 14, 2004

(30) Foreign Application Priority Data

Jul. 24, 2001    (JP) .............................. 2001-222876
Dec. 26, 2001    (JP) .............................. 2001-393457

(51) Int. Cl.
B29C 45/16    (2006.01)
(52) U.S. Cl. ................... 425/112; 264/255; 264/328.7; 264/328.8; 425/130; 425/DIG. 47
(58) Field of Classification Search ................ 425/112, 425/120, 130, DIG. 47; 264/255, 328.7, 264/328.8

See application file for complete search history.

(56) References Cited

U.S. PATENT DOCUMENTS 4,004,868 A * 1/1977 Ohdate ....................... 425/130

(Continued)

FOREIGN PATENT DOCUMENTS

JP    4-71216 U    6/1992

(Continued)

OTHER PUBLICATIONS

Partial machine translation of JP 2001-138334 A obtained from the JPO website.*

*Primary Examiner*—Tim Heitbrink
*Assistant Examiner*—Joseph Leyson
(74) *Attorney, Agent, or Firm*—Edwards Angell Palmer & Dodge LLP

(57) ABSTRACT

An in-mold coat-forming mold and an in-mold coat-forming method are provided, wherein the mold prevents leakage of a coating material for the long term, which is likely to occur when the in-mold coat-forming method is carried out. By disposing a grove, a pressure piece, or both of them so as to serve as coating-material leakage-preventing means, in the vicinity of the edge of a mold cavity adjacent to a shear-structured engaging portion disposed along the circumference of the mold cavity, a coating material is prevented from leaking out of the mold from the engaging portion, and problems such as an adverse affect on a formed product caused by the leaked coating-material and a damage on the mold are prevented, whereby in-mold coat-forming is stably performed for the long term.

5 Claims, 13 Drawing Sheets

U.S. PATENT DOCUMENTS

| | | | |
|---|---|---|---|
| 4,207,049 A * | 6/1980 | Malo et al. | 425/129.1 |
| 5,439,365 A * | 8/1995 | Hendry | 425/130 |
| 6,432,350 B1 * | 8/2002 | Seres et al. | 264/500 |
| 2006/0076712 A1 * | 4/2006 | Yonemochi et al. | 264/255 |

FOREIGN PATENT DOCUMENTS

| | | |
|---|---|---|
| JP | 05-082515 U * | 11/1993 |
| JP | 6-328505 | 11/1994 |
| JP | 9-48044 | 2/1997 |
| JP | 9-52257 | 2/1997 |
| JP | 2001-138334 | 5/2001 |
| JP | 2002-172657 | 6/2002 |
| WO | WO 01/07230 A1 * | 2/2001 |

* cited by examiner

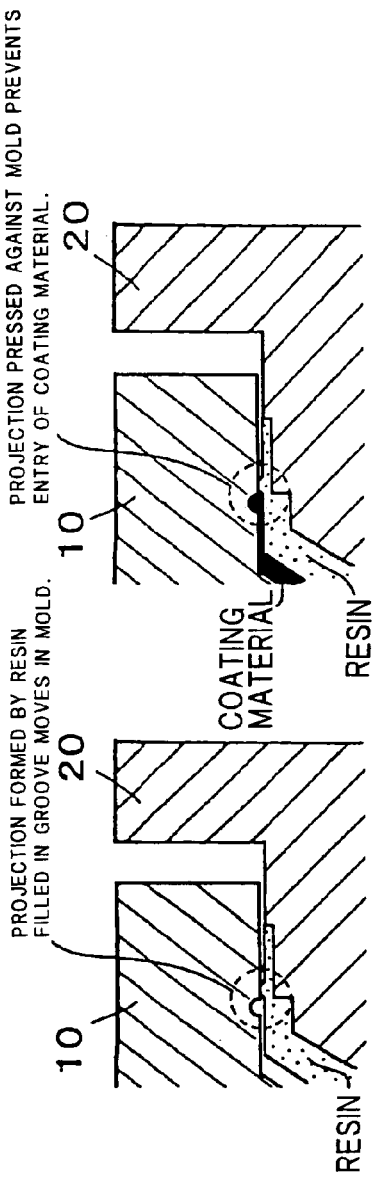

FIG.3(a) SEMICIRCLE TYPE
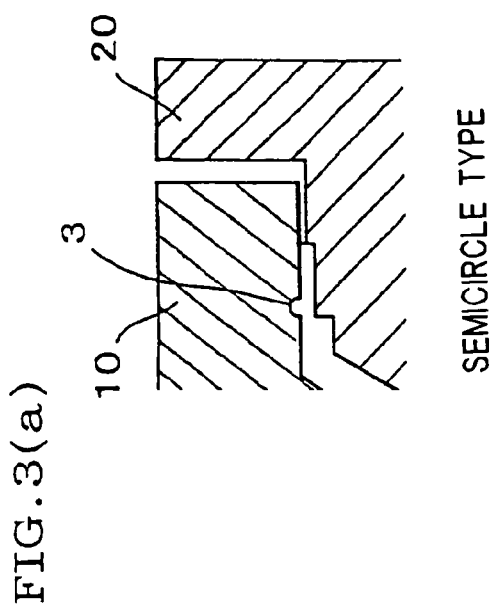
FIG.3(b) RECTANGLE TYPE
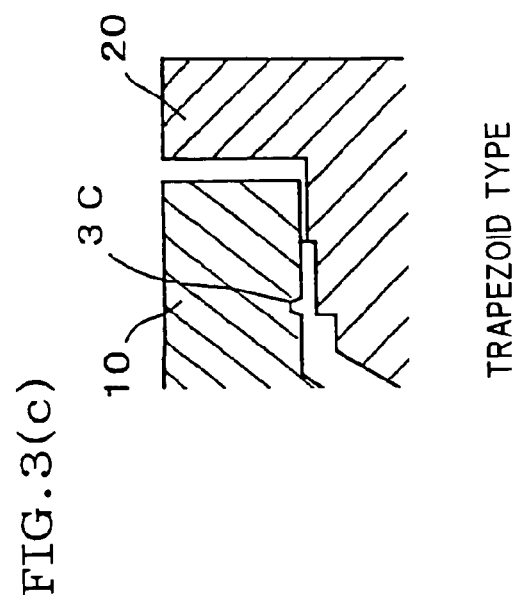
FIG.3(c) TRAPEZOID TYPE
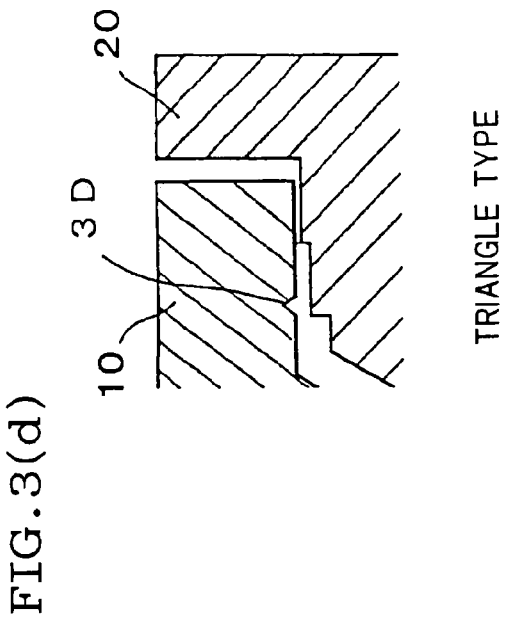
FIG.3(d) TRIANGLE TYPE

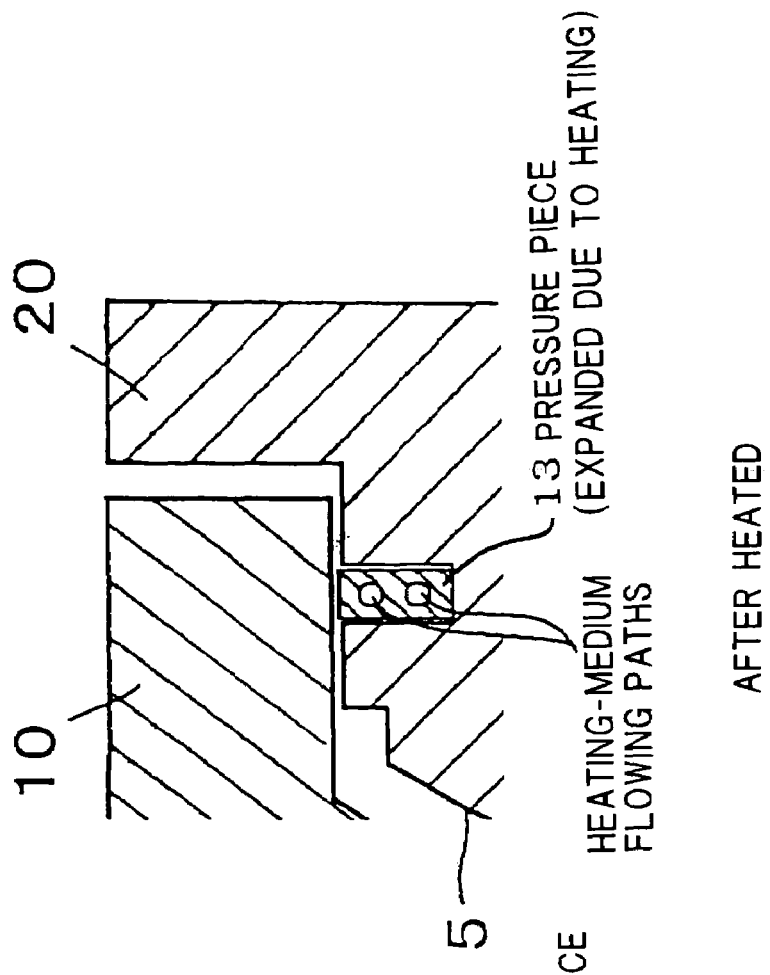

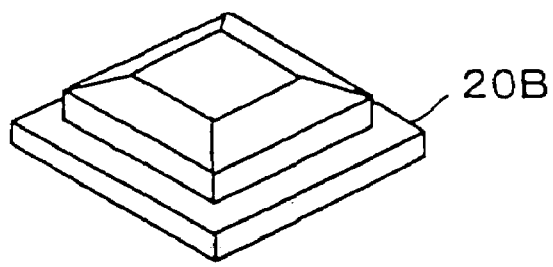
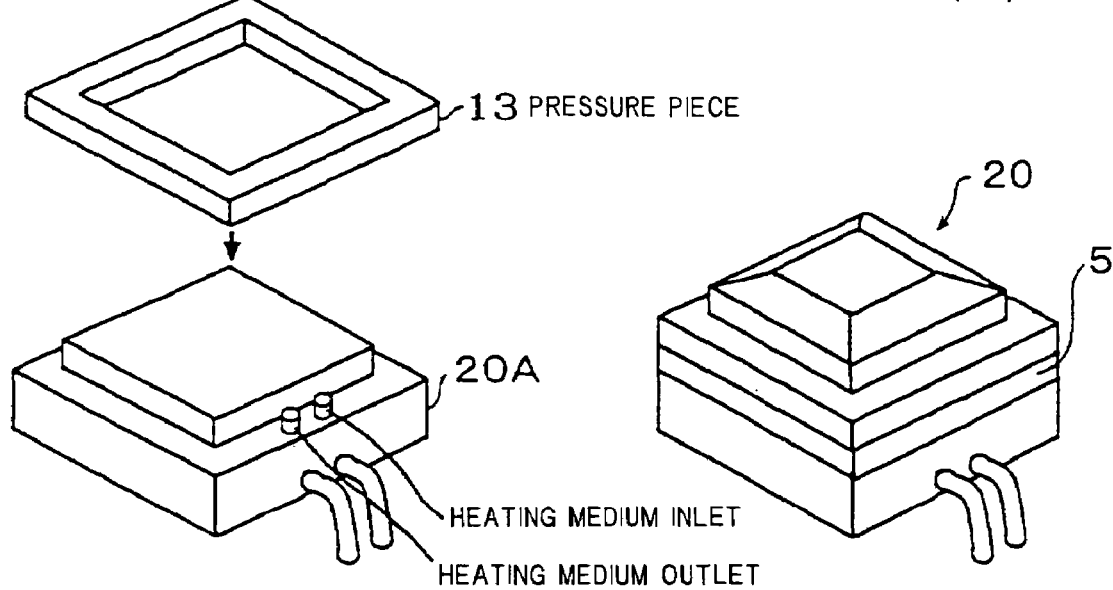

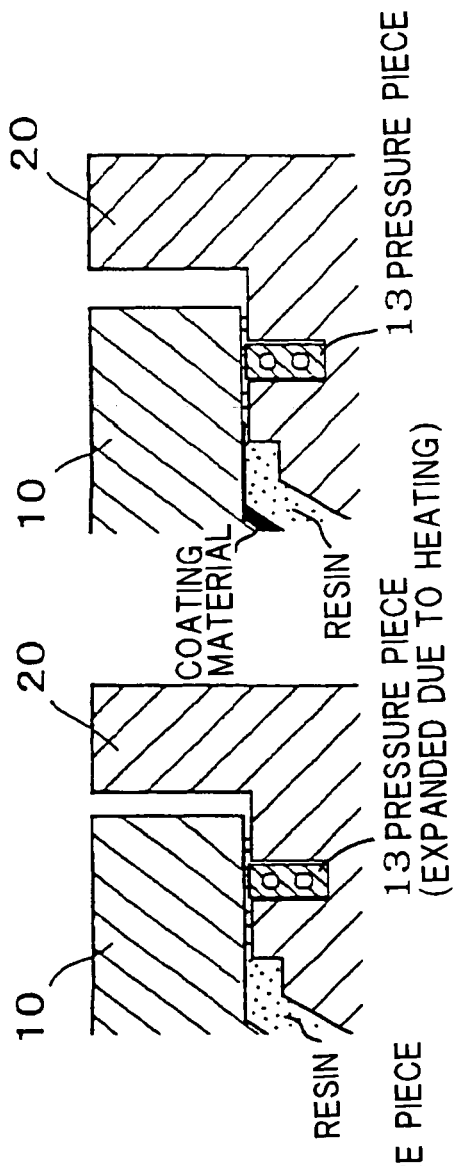

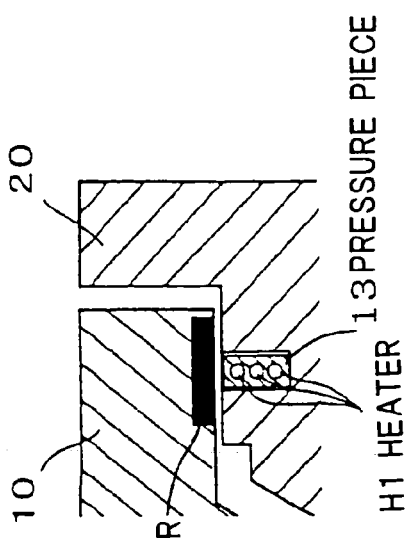
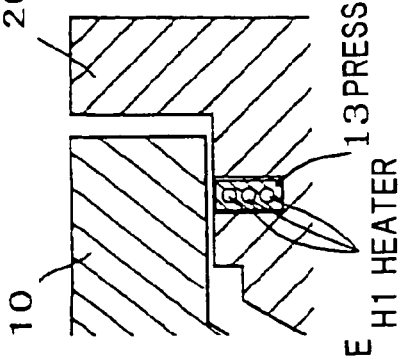
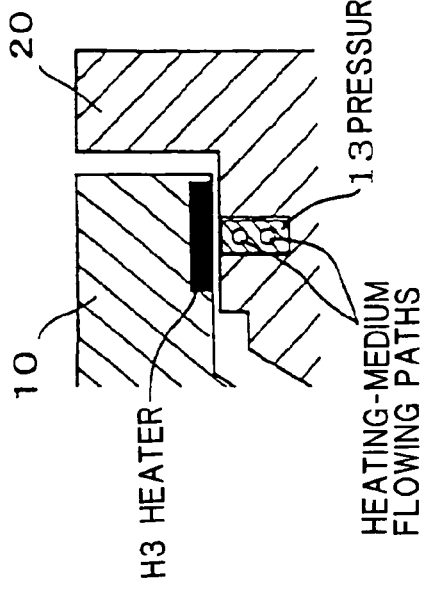

(12)United States Patent

INTERNALLY COATED MOLD, AND INTERNAL MOLD COATING FORMING METHOD

TECHNICAL FIELD

The present invention relates to an in-mold coat-forming mold and an in-mold coat-forming method using the mold with which, after a resin is formed in the mold, a coating material is injected between a resin formed product and the surface of a mold cavity and is cured so as to form a cover (sometimes, referred to as a coating or a film) on the surface of the resin formed product.

BACKGROUND ART

Hitherto, a coating method for decorating has been often used for improving decorativeness of a resin product having a base material composed of a thermoplastic resin.

With the known coating method, in general, after a formed product subjected to injection molding in a mold is taken out of the mold, a coating material is applied on the surface of the formed product by a spray method, an osmotic method, or the like. Then, by drying and curing the applied coating material, an unbreakable film is formed and the surface of the formed product is coated, so that the surface is decorated and protected.

However, in recent years, an in-mold coat-forming method (sometimes, referred to as an in-mold coating method) with which the forming with a resin and film coating are performed in the same mold has been proposed in order to eliminate a process of the above coating method.

FIG. 14 is a flowchart illustrating a general process of the in-mold coat-forming method. According to the in-mold coat-forming method shown in FIG. 14, after a resin is subjected to injection molding in a mold, the mold is slightly opened so as to form a clearance between the resin formed product formed in the mold and the surface of a mold cavity. Then, after a coating material is injected into the clearance by using a coating-material injector, the coating material is uniformly extended over the surface of the formed product by clamping the mold again and is then cured so as to coat the surface.

According to the in-mold coat-forming method, since the forming with a thermoplastic resin and the coating thereon are carried out in the same mold, a cost reduction by eliminating one process can be achieved, and at the same time, a problem in that suspended dust accretes on an uncured film and causes a defective product, and the like, seldom occur, thereby achieving a high-quality product.

Thus, an application of the foregoing in-mold coat-forming method for many parts, especially for automobile parts including a bumper, a side-mirror cover, and a fender which are required to have high-quality appearance, has been studied.

Meanwhile, many in-mold coat-forming methods are carried out by using a mold having a shear-structured engaging portion extending along the circumference of the mold cavity in order to prevent leakage of a coating material.

However, when a coating material is actually injected, sometimes the coating material leaks out of the mold cavity through the shear-structured engaging portion (sometimes, referred to as the shear portion), and as the number of usages of the mold increase, the shear portion is more worn away, causing the clearance of the shear portion to gradually increase and thus the coating material to be more likely leaked.

Meanwhile, sometimes the shear portion is generally called a shear-edge structure.

In order to prevent the above problem, an in-mold coat-forming mold with which leakage of a coating material is prevented by disposing an auxiliary cavity along the circumference of the mold cavity and by filling a coating material in the auxiliary cavity has been proposed in JP-A-2001-138334.

Although this mold has an excellent advantage in that a coating material is unlikely to leak even when its share portion is worn away, the coating material sometimes leaks due to shrinkage of a resin filled in the auxiliary cavity.

A cause of the leakage of a coating material when the known mold having the foregoing auxiliary cavity is used will be conceptually described with reference to FIGS. 5(a) to (c). Firstly, when a resin filled in an auxiliary cavity 1 as shown in FIG. 5(a) is cooled and shrinks thermally before the mold is slightly opened as shown in FIG. 5(b), a slight gap is formed between the auxiliary cavity 1 and the surface of the mold. This gap causes the coating material to leak out as shown in FIG. 5(c).

JP-A-9-48044 has disclosed an in-mold coating method using an injection mold which includes means for injecting a coating agent into the injection mold in order to apply a coating on the surface of a synthetic resin-formed product in the injection mold and which is characterized in that the injection mold is formed by at least two dividable mold members, the two mold members have an auxiliary cavity disposed in a parting surface thereof along the circumference of a main cavity so as to communicate with the main cavity, and a grooved thread for preventing the coating agent from flowing out is disposed in the auxiliary cavity so as to lie on the side of the surface through which the coating agent is injected, of the mold member, characterized in that, after a thermosetting resin or a thermo plastic resin is subjected to injection molding in the cavity, a mold-clamping force is decreased, and, when the surface of the resin is properly cured or solidified so as to stand against the injection-flowing pressure of the coating agent, the coating agent is injected in the boundary between the inner surface of the injection mold and the resin formed product with a higher pressure than the mold-claming force. However, the method disclosed in the Laid-open Patent Application has not disclosed an in-mold coat-forming method with which a coating material is injected after the mold is slightly opened in a positive manner.

In other words, the above method has disclosed that the mold-clamping force is decreased after a resin is subjected to injection molding; then, when the resin is cured or solidified to a degree to which the resin withstands against the injection-flowing pressure of the foregoing coating agent, by injecting the coating agent with a higher pressure than the clamping force, the coating agent causes the resin in the cavity to be compressed and also the mold to be detached therefrom; and the grooved thread formed in the auxiliary cavity receives the coating agent so as to effectively prevent it from flowing out from the parting surface caused by opening the mold. However, the above Laid-open Patent Application has not disclosed at all that a groove is disposed in the engaging portion or in the vicinity of the edge of the cavity adjacent to the engaging portion.

DISCLOSURE OF INVENTION

According to the present invention, an in-mold coat-forming mold and an in-mold coat-forming method using the mold are provided, wherein the mold has means for substantially preventing leakage of a coating material even when the mold is continuously used for the long term.

In the present invention, coating-material leakage-preventing means is a groove formed along the circumference of a cavity and in the vicinity of the edge of the cavity adjacent to an engaging portion of the mold, a pressure piece disposed at a part of the engaging portion of the mold, or a combination of both of them. Such coating-material leakage-preventing means provides an advantage in that leakage of a coating material is substantially prevented even when the mold is continuously used for the long term. The vicinity of the edge of the cavity lying adjacent to the engaging portion is intended to substantially mean the edge of the cavity itself or to include a part of the engaging portion. Also, a coating-material parting surface of the mold means a horizontal contact surface of male and female molds excluding for their surface forming a main cavity, and the engaging portion means a portion of the mold which lies in an extension of the surface forming the main cavity and a part of the surface of the mold parallel to the moving directions of one of the molds where the two molds can slide mutually in accordance with the move of the mold while lying in contact with each other or having a slight clearance therebetween.

Meanwhile, when a resin leaks out of the mold from a fine clearance of the engaging portion, the forming cannot be achieved. To prevent this problem, the engaging portion is required to stop leakage of the resin at least in the middle thereof, whereby the clearance inevitably has an upper limit in size.

In the meantime, while an auxiliary cavity, which will be described later in this specification, is not required to have a function for preventing a resin from leaking out of the mold, the engaging portion adjacent to the auxiliary cavity prevents a resin from leaking out of the mold.

Accordingly, since the auxiliary cavity and the engaging portion have apparently different working effects and preferable ranges from each other, the auxiliary cavity and the engaging portion are distinctively described in this specification.

More particularly, according to the present invention, an in-mold coat-forming mold and an in-mold coat-forming method using the mold as described below will be provided.

Firstly, there is provided an in-mold coat-forming mold which includes a mold cavity formed by a male mold and a female mold; a shear-structured engaging portion; and a coating-material injector for applying a coating, in the mold cavity, on the surface of a resin formed product formed in the cavity and which is characterized in that coating-material leakage-preventing means is disposed in the vicinity of the edge of the mold cavity adjacent to the engaging portion.

Meanwhile, the coating-material leakage-preventing means is preferably a groove formed in the vicinity of the edge of the mold cavity and disposed adjacent to the engaging portion so as to lie along the circumference of the cavity. Also, the coating-material leakage-preventing means may be a pressure piece disposed in the engaging portion and having at least one temperature-regulating element disposed therein. Furthermore, it may be a pressure piece disposed in a part of the engaging portion of the mold or a combination of the groove portion and the pressure piece.

In addition, the in-mold coat-forming mold may further include an auxiliary cavity extending in the opening and closing directions of the mold and disposed along the circumference of the edge of the mold cavity.

Secondly, an in-mold coat-forming method is provided. More particularly, there is provided an in-mold coat-forming method using an in-mold coat-forming mold which includes a mold cavity formed by a male mold and a female mold; a shear-structured engaging portion; and a coating-material injector for applying a coating, in the mold cavity, on the surface of a resin formed product formed in the cavity and which is characterized in that coating-material leakage-preventing means is disposed in the vicinity of the edge of the mold cavity adjacent to the engaging portion, characterized in that, after a resin is formed in the mold, the mold is slightly opened so as to have a coating material injected therein and is then clamped again so that the coating material extends across the surface of the formed product in the mold and coats the formed product.

In addition, an in-mold coat-forming method using an in-mold coat-forming mold which includes a mold cavity surrounded along the circumference thereof, by a shear-structured engaging portion formed by a male mold and a female mold; and a coating-material injector for injecting a coating material into the mold cavity and which is characterized in that a pressure piece having at least one temperature-regulating element disposed therein is disposed in the engaging portion, characterized in that, after a resin is formed in the mold, the mold is slightly opened so as to have a coating material injected therein and is then clamped again so that the coating material extends across the surface of the formed product in the mold and coats the formed product.

Furthermore, an in-mold coat-forming method using an in-mold coat-forming mold which includes a mold cavity formed by a male mold and a female mold; a shear-structured engaging portion; and a coating-material injector for applying a coating, in the mold cavity, on the surface of a resin formed product formed in the cavity and which further includes a groove formed along the circumference of a cavity and in the vicinity of the edge of the cavity and disposed adjacent to an engaging portion of the mold, and an auxiliary cavity extending in the opening and closing directions of the mold and disposed along the circumference of the edge of the mold cavity, characterized in that, after a resin is formed in the mold, the mold is slightly opened so as to have a coating material injected therein and is then clamped again so that the coating material extends across the surface of the formed product in the mold and coats the formed product.

BRIEF DESCRIPTION OF THE DRAWINGS

FIGS. 2(a), (b), and (c) are conceptual views illustrating a behavior when leakage of a coating material is prevented by a projection formed by a groove which serves as coating-material leakage-preventing means and which is disposed in an in-mold coat-forming mold according to an embodiment in accordance with a first aspect of the present invention, wherein (a) and (b) respectively illustrate states in which the mold is to be slightly opened and is slightly opened, and (c) illustrates a state in which a coating material is injected.

FIGS. 3(a), (b), (c), and (d) are sectional views in essential part illustrating the shapes of grooves serving as coating-material leakage-preventing means in accordance with the first aspect of the present invention, wherein (a), (b), (c), and (d) respectively illustrate a semicircle type, a rectangle type, a trapezoid type, and a triangle type.

FIGS. 7(a) and (b) are sectional views in essential part illustrating the structure of the in-mold coat-forming mold according to the embodiment in accordance with the second aspect of the present invention.

FIGS. 8(a) and (b) are erection diagrams illustrating the structure of a fixed mold used in the in-mold coat-forming mold according to the embodiment in accordance with the second aspect of the present invention, wherein (a) schematically illustrates the structure of a pressure piece, and (b) illustrates an assembled state.

FIGS. 9(a), (b), and (c) are conceptual views illustrating a behavior of the pressure piece used in the in-mold coat-forming mold according to the embodiment in accordance with the second aspect of the present invention, wherein (a) and (b) respectively illustrate states in which the pressure piece is to be heated and is heated, and (c) illustrates a state in which a coating material is injected.

FIGS. 10(a), (b), and (c) are sectional views in essential part illustrating in-mold coat-forming molds according to other embodiments in accordance with the second aspect of the present invention, wherein (a) illustrates a mold having a heater disposed therein so as to face the pressure piece, (b) illustrates a mold having a heater built in the pressure piece, and (c) illustrates a mold formed by combining (a) and (b).

BEST MODE FOR CARRYING OUT THE INVENTION

Figure 1:
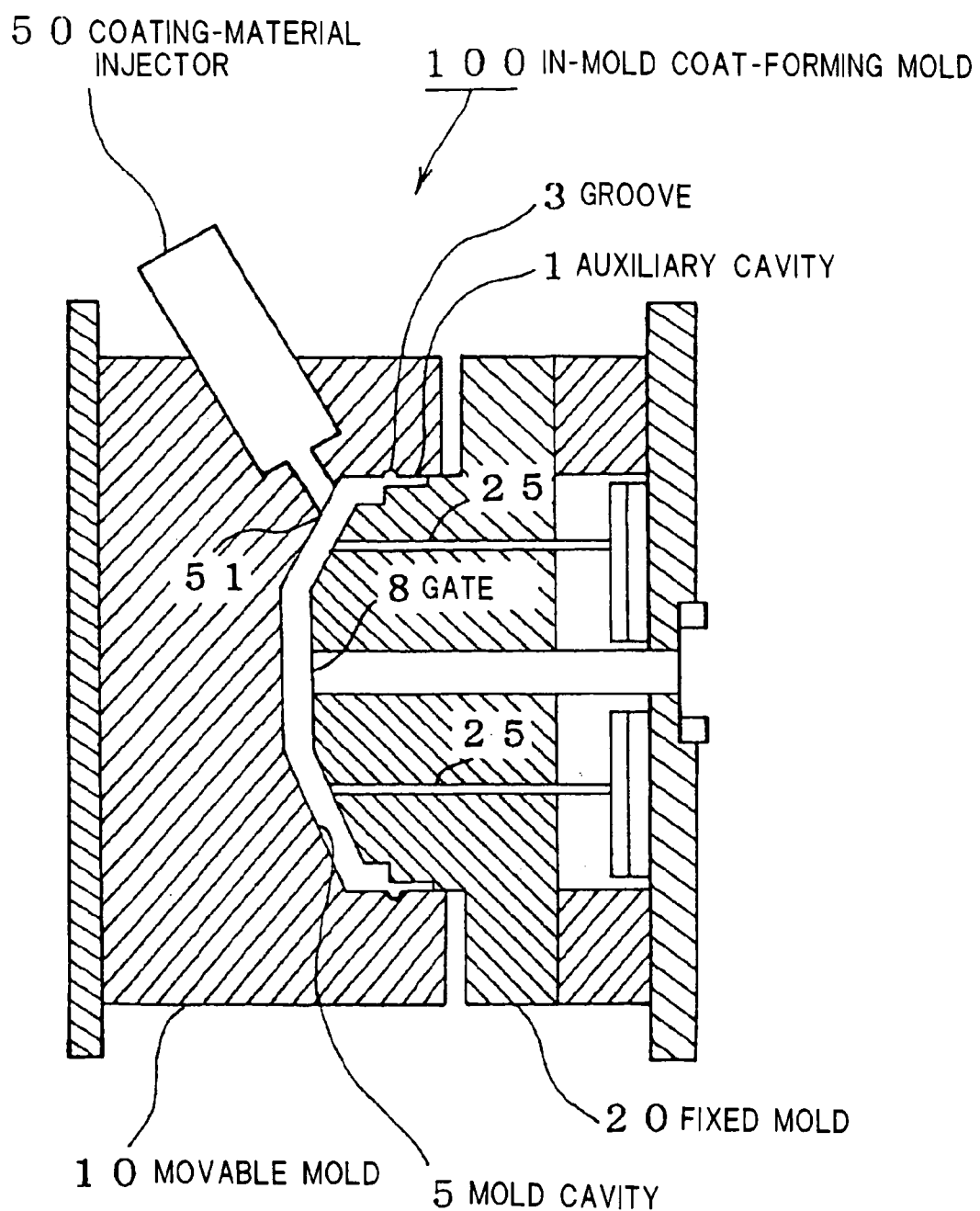
FIG. 1 is a sectional view illustrating the structure of an in-mold coat-forming mold according to the present invention.

First of all, aspects of the present invention will be briefly described. Roughly speaking, the present invention broadly has two aspects. A first aspect relates to an in-mold coat-forming mold and an in-mold coat-forming method using the mold, wherein the mold has a groove formed along the circumference of the edge of a cavity so as to serve as coating-material leakage-preventing means. This aspect includes a mode in which an auxiliary cavity 1 is formed along the circumference of a mold cavity 5 so as to extend in the opening and closing directions of the mold, and the groove is formed along a portion, corresponding to the edge of the cavity 1, of one of moving and fixed molds having no auxiliary cavity 1 formed therein.

A second aspect relates to an in-mold coat-forming mold and an in-mold coat-forming method using the mold, wherein the mold includes a mold cavity formed by a male mold and a female mold; a shear-structured engaging portion; and a coating-material injector for applying a coating, in the mold cavity, on the surface of a resin formed product formed in the mold cavity, and is characterized in that a pressure piece having at least one temperature regulating element disposed therein is disposed in the engaging portion therein so as to serve as coating-material leakage-preventing means.

In addition, a third aspect includes a mold having both the groove serving as the coating-material leakage-preventing means in accordance with the first aspect and the pressure piece serving as the coating-material leakage-preventing means in accordance with the second aspect in combination and an in-mold coat-forming method using the mold.

In the present invention, the coating-material leakage-preventing means can be provided in either of the fixed mold and the movable mold. However, when a groove 3 is provided as the coating-material leakage-preventing means, in association with its coating-material leakage-preventing action, the groove 3 is preferably formed in one of the molds on which a formed product does not accrete at the time of slightly opening the mold, that is, it is preferably formed in the surface of one of the molds in which a gap for injecting a coating material is formed at the time of slightly opening the mold. The reason for this is such that a resin filled in the groove 3 forms a projection at the time of slightly opening the mold, and the projection prevents leakage of the coating material upon getting out of the groove 3. Since a formed product accretes generally on a male mold (regardless of moving and fixed molds) at the time of slightly opening the mold, the groove 3 is preferably formed in the female mold.

When a pressure piece 13 is provided so as to serve as the coating-material leakage-preventing means, in association with its coating-material leakage-preventing action, the pressure piece 13 is preferably formed in one of the molds on which a formed product accretes at the time of slightly opening the mold, that is, it is preferably formed in the surface of one of the molds in which a gap for injecting a coating material is not formed at the time of slightly opening the mold. The reason for this is such that the pressure piece 13 prevents leakage of a coating material by pressing a part of a resin. Since a formed product accretes generally on a male mold (regardless of moving and fixed molds) at the time of slightly opening the mold, the pressing piece 13 is preferably formed in the male mold.

Figure 4:
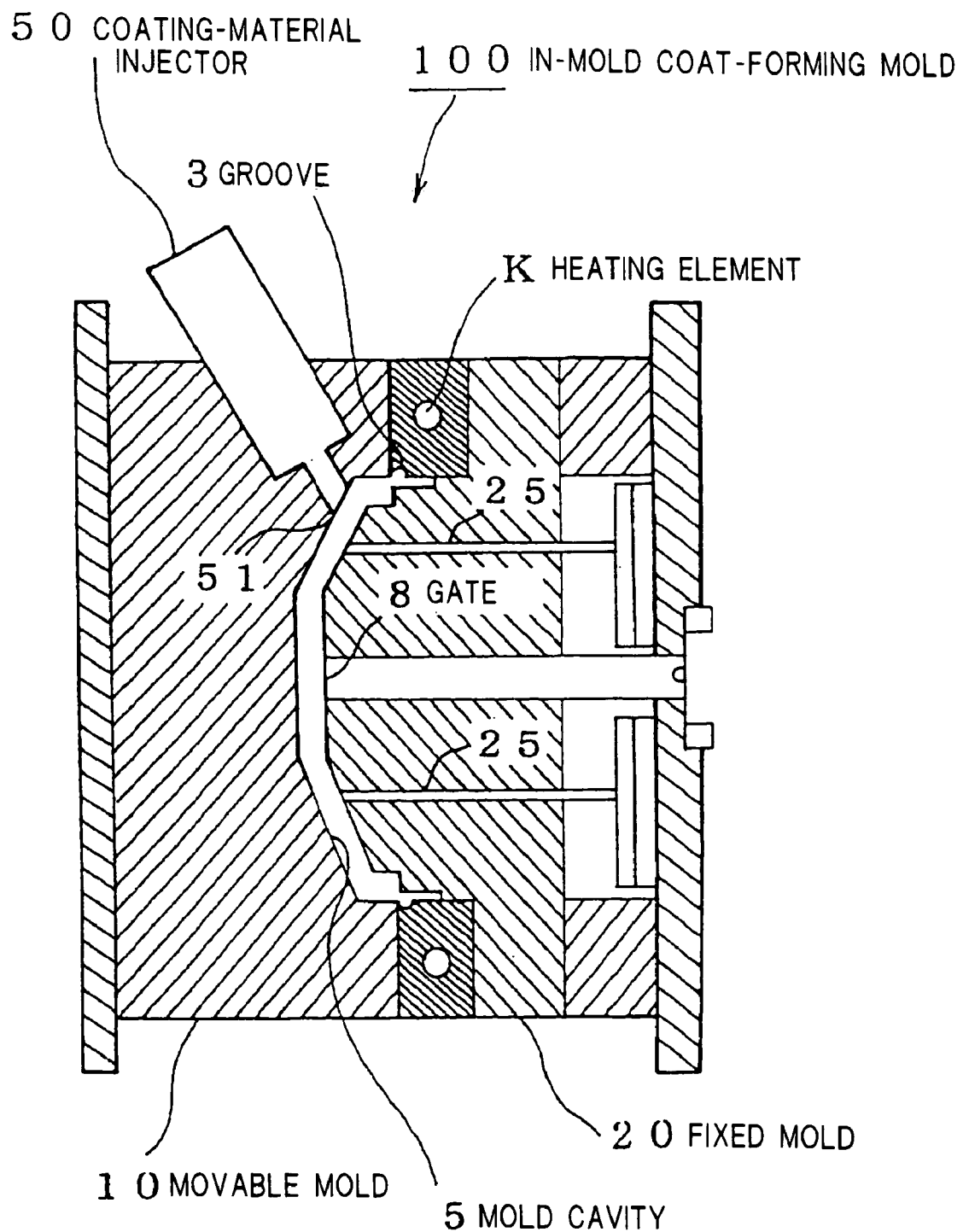
FIG. 4 is a sectional view in essential part illustrating the structure of an in-mold coat-forming mold according to another embodiment in accordance with the first aspect of the present invention.
Figure 5:
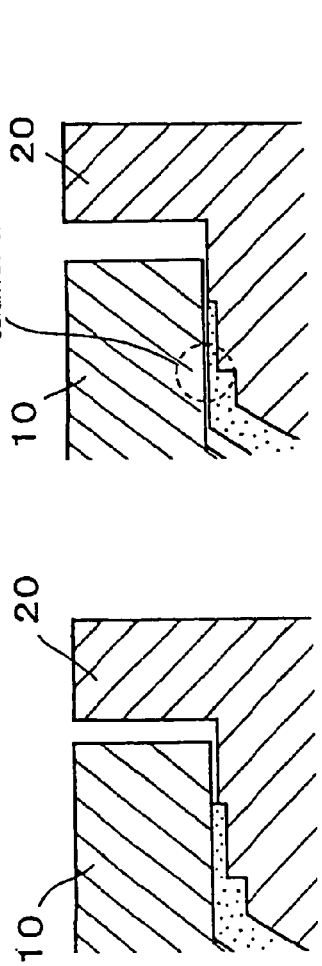
FIGS. 5(a), (b), and (c) are conceptual views illustrating a behavior when leakage of a coating material occurs in a known mold, wherein (a) and (b) respectively illustrate states in which the mold is to be slightly opened and is slightly opened, and (c) illustrates a state in which a coating material is injected.
Figure 14:
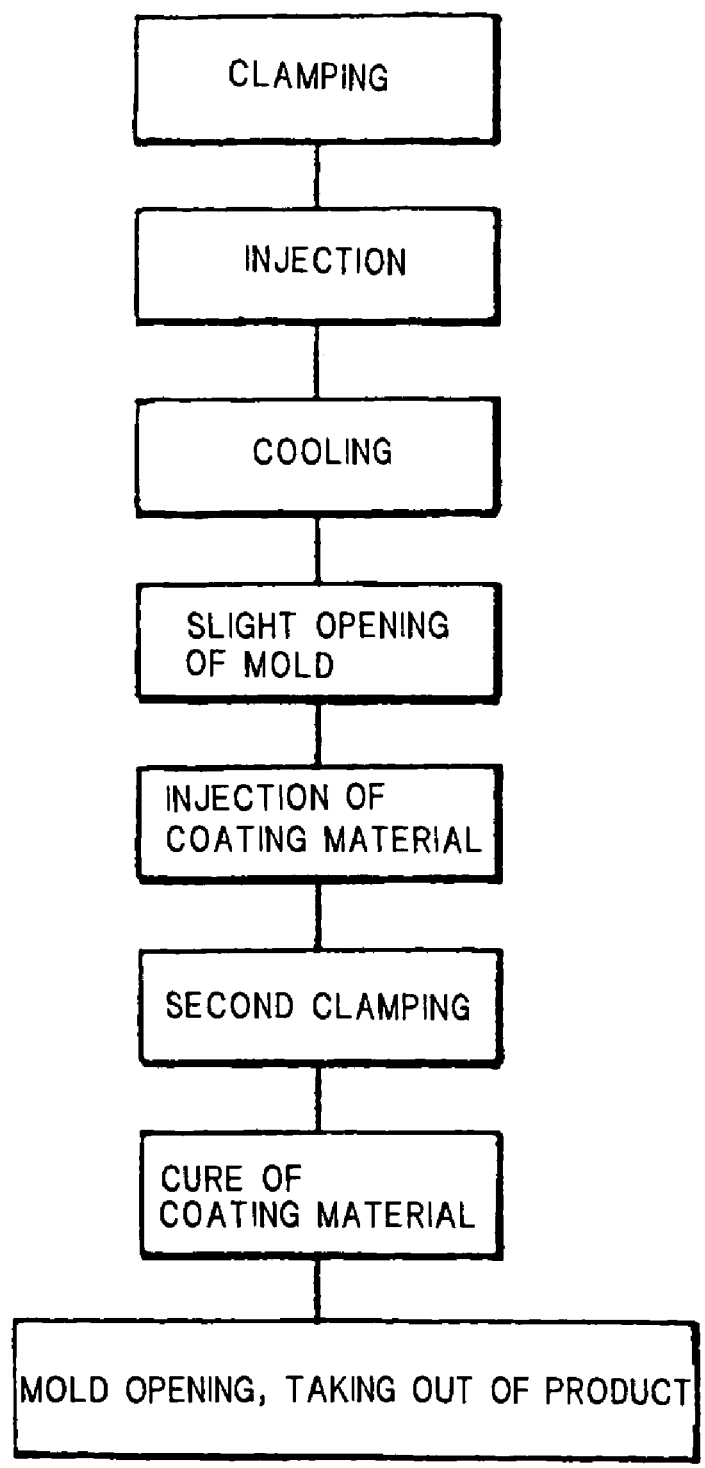
FIG. 14 is a flowchart illustrating a process of a known in-mold coat-forming method.

An embodiment of the in-mold coat-forming mold in accordance with the first aspect of the present invention will be described with reference to the drawings. Meanwhile, regarding the first aspect of the present invention, a mode in which an auxiliary cavity is provided will be described. FIG. 1 is a sectional view illustrating the structure of the in-mold coat-forming mold according to the present invention, and FIGS. 2 to 4 illustrate a preferable example of the embodiment in accordance with the first aspect of the present invention. FIG. 2 is a conceptual view illustrating a behavior when leakage of a coating material is prevented by a projection formed by a groove formed in the in-mold coat-forming mold. FIG. 3 is a sectional view in essential part illustrating the shape of the groove formed in the in-mold coat-forming mold in accordance with the first aspect. FIG. 4 is a sectional view in essential part illustrating the structure of an in-mold coat-forming mold according to another embodiment in accordance with the first aspect of the present invention. FIG. 5 is a conceptual view illustrating a behavior when leakage of a coating material occurs in a known mold. Also, FIG. 14 is a flowchart illustrating a process of a known in-mold coat-forming method.

The structure of a preferable example of an in-mold coat-forming mold 100 (sometimes, referred to as a mold 100) according to the present invention will be described in detail with reference to FIG. 1. In the present invention, components and members, each having the same function or structure, are represented by the same reference numerals.

The mold 100 according to the present invention has a movable mold 10, a fixed mold 20, and a coating-material injector 50, and in the example embodiment of the present invention shown in FIG. 1, the movable mold 10 is a female mold and the fixed mold 20 is a male mold.

The mold 100 shown in FIG. 1 has a structure in which the fixed mold 20 serving as a male mold and the movable mold 10 serving as a female mold are engaged with each other along a shear-structured engaging portion, an auxiliary cavity 1 is formed along the circumference of a mold cavity 5 so as to extend in the opening and closing directions of the mold, and the shear-structured engaging portion and the mold cavity 5 are communicated with each other having the auxiliary cavity 1 interposed therebetween.

In the embodiment shown in FIG. 1, the auxiliary cavity 1 has the groove 3 having a semicircular cross-section, disposed along the circumference thereof on the outer peripheral side thereof (on the side of a coating surface).

By forming the mold 100 so as to have the above-mentioned structure, a resin filled in the mold cavity 5 at the time of injection is also filled in the auxiliary cavity 1 and the groove 3 at the same time. FIG. 2(*a*) illustrates a state in which a resin is filled in the auxiliary cavity 1 and the groove 3.

Meanwhile, in the embodiment shown in FIG. 1, the fixed mold 20 serving as a male mold has the auxiliary cavity formed therein, and the movable mold 10 serving as a female cavity has the groove 3 formed therein. However, forming locations of the auxiliary cavity 1 and the groove 3 according to the present invention are not limited to the above arrangement; alternatively, the auxiliary cavity and the groove 3 may be respectively formed in one of the molds not lying on the side of the coating surface and in the other mold lying on the side of the coating surface.

Although the groove 3 formed in the mold 100 shown in FIG. 1 has a semicircular cross-section as shown in FIG. 3(*a*), the groove 3 is not limited to the above shape and it may be, for example, a rectangular groove shown in FIG. 3(*b*), a trapezoidal groove shown in FIG. 3(*c*), or a triangular groove shown in FIG. 3(*d*).

The depth (the length perpendicular to the opening and closing directions of the movable mold 10) of the groove 3 at its deepest position is preferably from 0.01 mm to 1 mm, more preferably from 0.01 mm to 0.5 mm, and the most preferably from 0.01 mm to 0.2 mm. The width of the groove is preferably from 0.01 mm to 1 mm, but it is not always limited to this range. For example, even when the width lies out of this range, in a mode in which a mold having an auxiliary cavity is used, when the mold is opened for injecting an coating material, it is only required that the relationship between the width and the depth does not cause a formed product formed in the mold cavity 5 and a part of a resin filled in the auxiliary cavity 1 to be cut or a projection formed by the resin formed in the groove 3 to be cut.

Also, the length (length extending in the opening and closing directions of the movable mold 10) L of the auxiliary cavity 1 is from 0.5 mm to 50 mm, preferably from 0.1 mm to 50 mm, and more preferably from 0.5 mm to 2 mm, and the thickness (length extending perpendicular to the opening and closing directions of the movable mold 10) T is not greater than the thickness of a formed product, preferably not greater than 1 mm, and more preferably from 0.2 mm to 0.5 mm. The great thickness causes not only waste of a part of the resin but also a risk of deteriorating a preventive effect against outflow of a coating material because of large shrinkage of the resin on cooling.

Next, an example of the structure of the coating-material injector 50 will be briefly described.

The coating-material injector 50 (sometimes, referred to as an injector) according to the embodiment in accordance with the first aspect is fixed to the movable mold 10 so as to inject a coating material into the mold cavity 5 through a coating-material inlet 51 disposed in the mold cavity 5 of the movable mold 10. Also, the coating-material inlet 51 of the coating-material injector 50 has a valve (not shown) fixed thereto, and, when a base material is subjected to injection molding, the valve is closed so as to prevent a resin injected in the mold cavity 5 of the mold 100 from entering into the coating-material injector 50 through the coating-material inlet 51.

With this arrangement, the coating-material injector 50 in the present embodiment is driven by a driving apparatus (not shown) so as to accurately inject a desired amount of the coating material fed in the coating-material injector 50 through the surface of the cavity 5 of the movable mold 10.

Although the coating-material injector 50 in the present embodiment is constructed so as to inject a coating material through the surface of the cavity 5 of the movable mold 10 as described above, it is not limited to the above structure. Since the coating-material injector 50 is sufficient as long as it is constructed so as inject a coating material into a clearance formed between a resin formed product formed in the mold cavity 5 and the surface of the mold cavity 5, it may be fixed to the fixed mold 20. Also, although the coating-material injector 50 in the present embodiment is singular, it is not limited to the above arrangement and may be plural.

An in-mold coat-forming method using the mold 100 will be described in detail below with reference to FIGS. 1, 2, and 14.

As a first step, the mold 100 is clamped by a mold-clamping apparatus of an injection molding machine (not shown).

Then, a thermoplastic resin serving as a base material (an ABS resin UT 20B made by UBE CYCON Ltd. is used as the base material in the present embodiment) is injected into the mold, and the base material is cooled down to a certain extent (to an extent to which a formed product is not deformed even when the mold is opened).

Meanwhile, although cooling is generally performed to an extent to which the formed product is not deformed even when the mold is opened in the above step in the present embodiment, if the deformation of the injected base material occurring when the mold is opened is removed in the course of second clamping after injection of a coating material, which will be describe later, it is sufficient to cool the base material to an extent to which the coating material does not enter into the base material when the coating material is injected into the mold cavity 5.

FIG. 2(*a*) illustrates a state in which the resin is filled in the mold cavity 5 of the mold 100. In the embodiment shown in FIG. 2(a), the resin having entered into the auxiliary cavity 1 and the groove 3 has been solidified.

After the base material is cooled, in a state in which the mold is slightly opened (in the present embodiment, in a state in which the movable mold 10 is moved by 1 mm in the opening direction of the mold) as shown in FIG. 2(b), a space for injecting the coating material for coating is formed between a resin formed product formed in the mold cavity 5 and the surface of the mold cavity 5 of the movable mold 10.

In this occasion, the resin filled in the groove 3 gets out of the groove 3 pulled by the resin filled in the auxiliary cavity 1. The resin filled in the groove 3 forms a projection upon getting out of the groove 3 and the projection is likely to move in the mold.

Although a slight gap is formed between the resin formed in the auxiliary cavity 1 and the surface of the mold since the resin filled in the mold shrinks due to its solidification, since the resin filled in the foregoing groove 3 forms a projection upon getting out of the groove 3, and the projection moves in the mold while being pressed, the slight gap is filled with the resin forming the projection.

After the space for injecting the coating material is formed, the coating material of 7 milliliters is injected into the space with the coating-material injector 50.

Table 1 shows components of the coating material used in the present embodiment.

TABLE 1

| name of component | weight (%) |
|---|---|
| urethane acrylate oligomer (NW = 2500) | 16.0 |
| epoxy acrylate oligomer (NW = 540) | 16.0 |
| Styrene | 22.0 |
| zinc stearate | 0.3 |
| titanium oxide | 44.0 |
| carbon black | 0.1 |
| 8% cobalt octoate | 0.6 |
| tert-butyl peroxy 2-ethyl hexanoate | 1.0 |

After the coating material is injected into the gap by using the coating-material injector 50, the movable mold 10 is moved towards the fixed mold 20, and the mold 100 is closed again and is then clamped, so as to cause the coating material in the gap to flow while being pressed out, to extend in every corner of the cavity 5 of the mold 100, and at the same time, to be kept in a state of having a pressure applied thereon.

In this occasion, in a case of a known mold having no groove 3 formed therein, sometimes a coating material leaks out from the slight gap formed between the auxiliary cavity 1 and the surface of the mold as its behavior is conceptually illustrated in FIG. 5.

On the contrary, when coat-forming is performed by using the mold 100 in the present embodiment, as shown in FIG. 2(c), the resin filled in the groove 3 forms a projection, and the projection formed in the groove moves in the mold and seals the gap through which the coating material otherwise would leak out, thereby preventing a problem of leakage of a coating material.

The coating material extends in every corner of the cavity 5 of the mold 100 and is cured at the same time in a state of having a pressure applied thereon in the foregoing step, and, after the coating material is cured, the mold is opened so as to take out a finished product therefrom.

Meanwhile, the coating material used in the present embodiment is thermosetting and is accordingly readily cured at a set mold temperature.

As described above, according to the embodiment shown in FIG. 1, a problem in that a leaked coating material gets mixed in a finished product in the following forming and has an adverse affect thereon, a problem of damaging the mold, or the like is eliminated, whereby stable in-mold coat-forming can be performed for the long term.

FIG. 4 illustrates the structure of an in-mold coat-forming mold according to another embodiment in accordance with the first aspect, in which a portion of the mold having the groove 3 formed therein is constructed so as to have a nested structure, and the nested portion has a heating element K disposed therein.

The heating element K is circumferentially disposed along the engaging portion so as to surround the engaging portion, and a heater (not shown) disposed in the heating element K heats a coating material filled in the mold cavity 5.

Since the in-mold coat-forming mold having the heating element K disposed therein has an excellent advantage in that, since the mold has an working effect of accelerating a curing reaction of the coating material which is likely to leak out of the mold by highly heating it with the heating element K, and the coating material whose curing reaction has progressed is unlikely to flow because of its increased viscosity, the coating material is further unlikely to leak from the shear portion.

Meanwhile, although the embodiment shown in FIG. 4 is preferable because of its great advantage in that, by circumferentially disposing the heating element K so as to surround the engaging portion, the coating material is further unlikely to leak from the entire engaging portion, the heating element K is not necessarily disposed along the circumference of the engaging portion, and leakage of the coating material can be prevented as long as the heating element K is disposed at key spots of the engaging portion; hence the heating element K is not needed to be disposed along the circumference of the engaging portion.

Meanwhile, although the heating element K used in the embodiment shown in FIG. 4 is a type having an electrothermal heater H1 disposed therein, the heating element K is not limited to the above type, and it may be of a type having, for example, at least one heating-medium flowing path for allowing heated oil to flow therein or of a type having a combination of the electrothermal heater H1 and the heating-medium flowing path.

Figure 13:
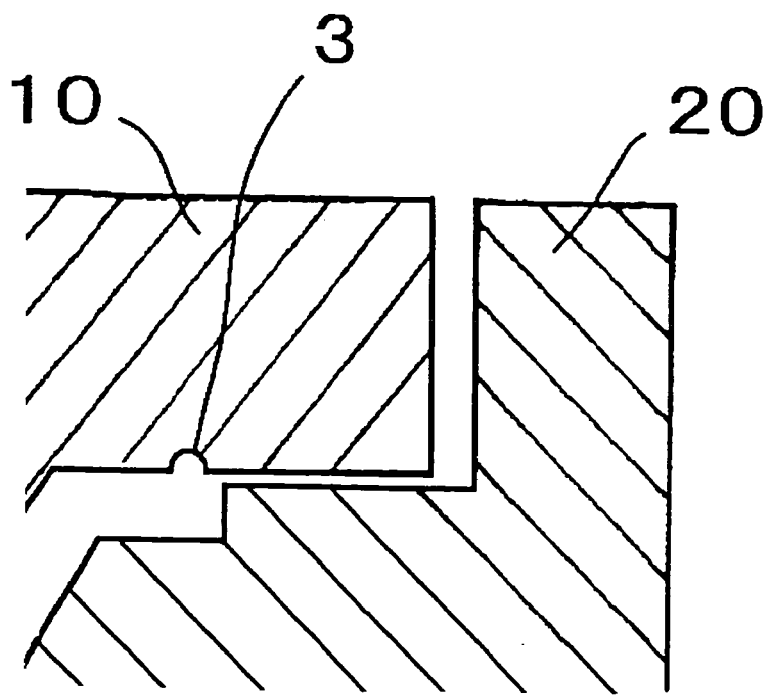
FIG. 13 is a sectional view in essential part illustrating the structure of an in-mold coat-forming mold according to another mode in accordance with the first aspect of the present invention, in which the groove serving as the coating-material leakage-preventing means is formed along the circumference of the edge of a cavity.

According to another embodiment in accordance with the first aspect, as shown in FIG. 13, there is provided an in-mold coat-forming mold having a structure in which the groove serving as the coating-material leakage-preventing means is formed along the circumference of the edge of the cavity of the mold without having an auxiliary cavity disposed therein. The mold according to this mode is suitably used when esthetic painting is not required along the end of a formed product lying in contact with the shear portion. More particularly, for example, with respect to a side-mirror cover as an automobile component, since the end of its formed product lying in contact with the shear portion is hidden behind another component when it is fixed, painting of the end is not substantially required. In addition, even when the groove 3 causing defective appearance of the end of such a formed product lying in contact with the shear portion is formed, no problem occurs.

Accordingly, the end of the formed product lying in contact with the shear portion may be regarded as the auxiliary cavity 1 having the same thickness as that of the formed product. Hence, in this case, as shown in FIG. 3, those skilled in the art will easily appreciate that the auxiliary cavity 1 unnecessary for forming a formed product is not needed to be newly formed along the peripheral end of the formed product, and the groove disposed along a portion corresponding to the end of the formed product does not cause a problem.

Figure 6:
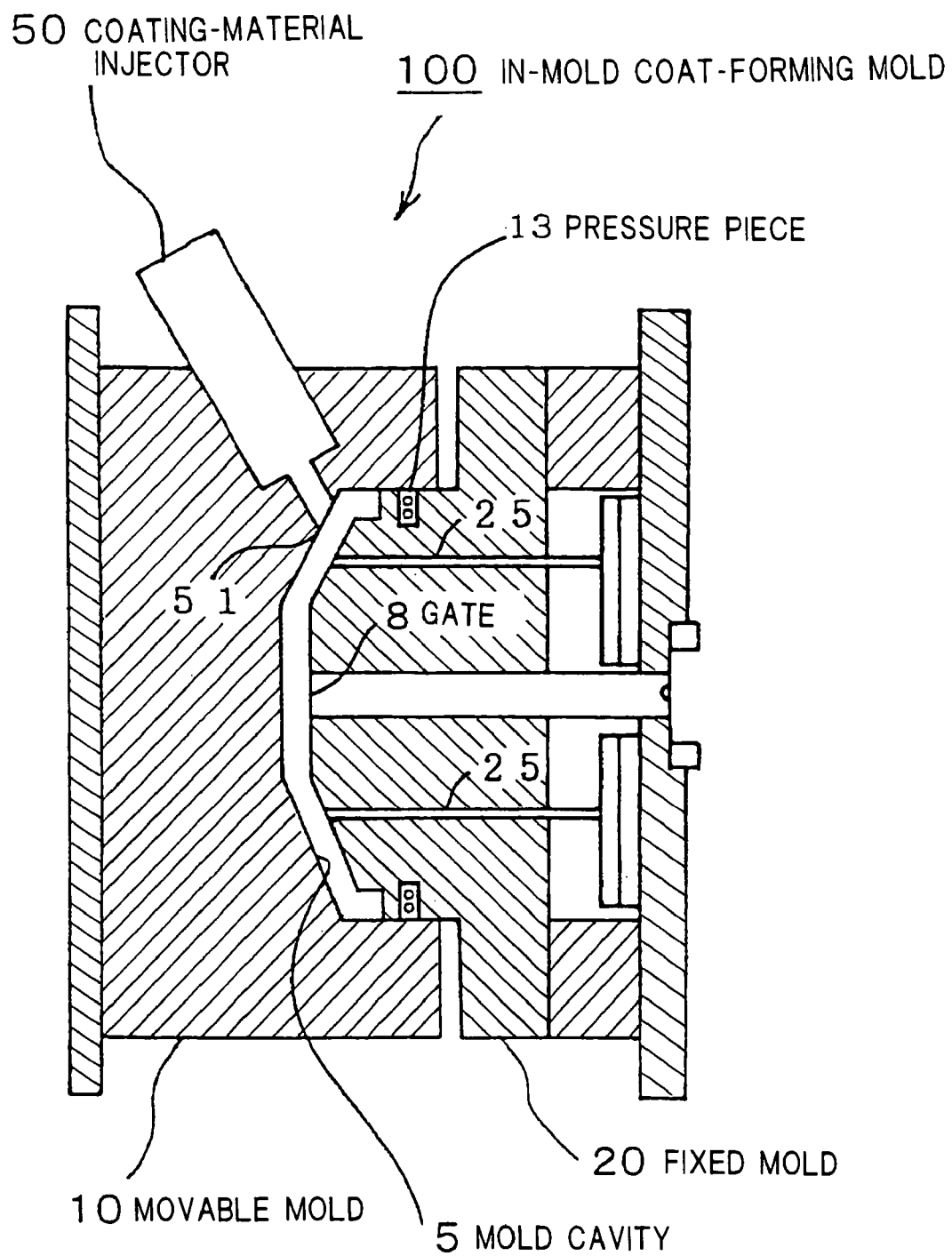
FIG. 6 illustrates the structure of an in-mold coat-forming mold according to an embodiment in accordance with a second aspect of the present invention.
Figure 11:
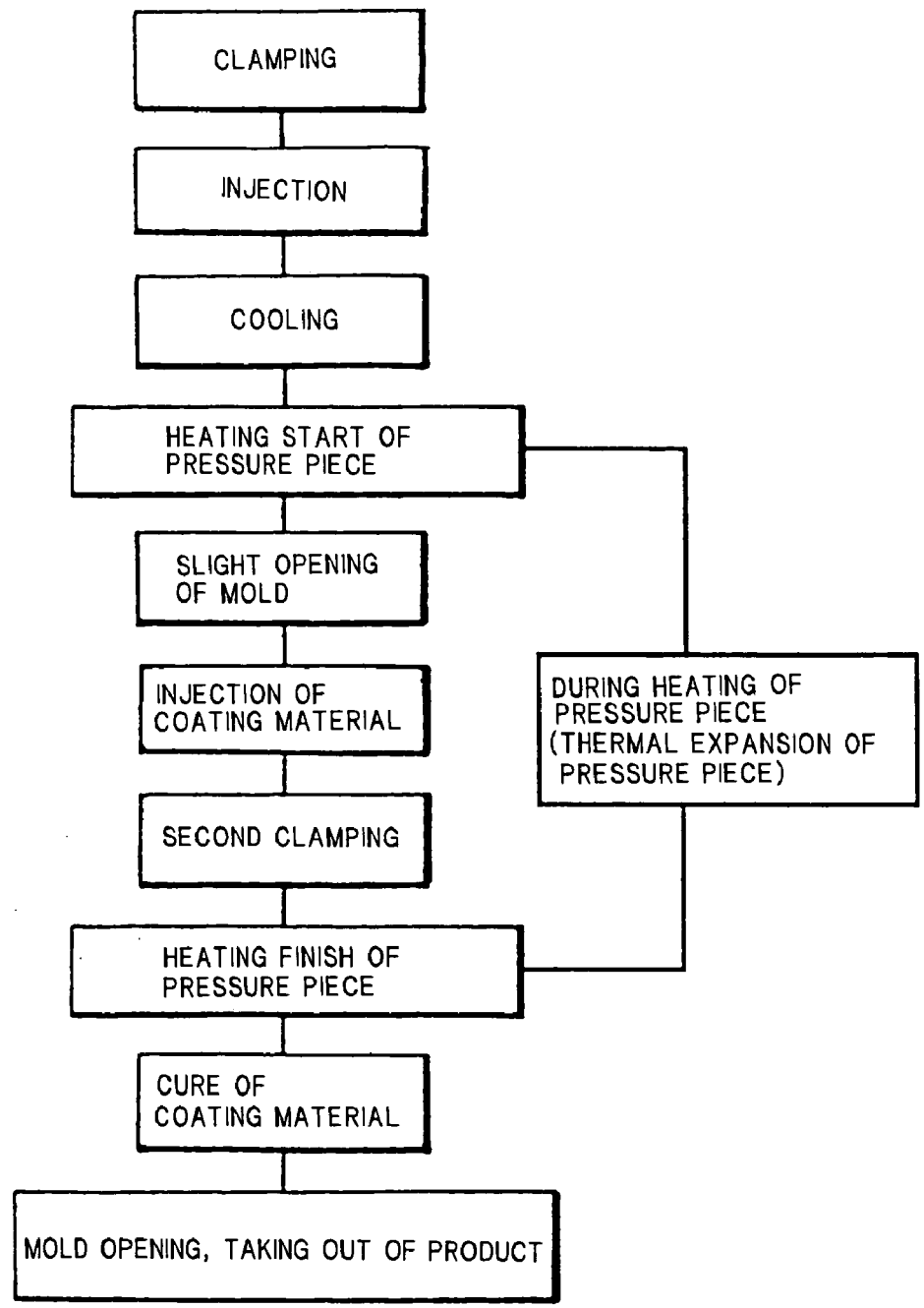
FIG. 11 is a flowchart illustrating a process of an in-mold coat-forming method according to an embodiment in accordance with the second aspect of the present invention.

Subsequently, embodiments of the in-mold coat-forming molds in accordance with the second aspect of the present invention will be described with reference to the drawings. FIGS. 6 to 11 illustrate an embodiment of the second aspect of the present invention. FIG. 6 illustrates the general structure of the in-mold coat-forming mold, and FIG. 7 is a sectional view in essential part illustrating the structure of the in-mold coat-forming mold. FIG. 8 is an erection diagram of a general erection procedure illustrating the structure of the fixed mold used in the in-mold coat-forming mold, and FIG. 9 is a conceptual view illustrating a behavior of the pressure piece used in the in-mold coat-forming mold. FIG. 10 is a sectional view in essential part illustrating in-mold coat-forming molds according to other embodiments, and FIG. 11 is a flowchart illustrating a process of the in-mold coat-forming method. FIG. 14 is the flowchart illustrating the process of the known in-mold coat-forming method.

The structure of a preferable example of the in-mold coat-forming mold 100 (sometimes, referred to as the mold 100) in accordance with the second aspect of the present invention will be described in detail with reference to FIG. 6.

The mold 100 according to the present invention has the movable mold 10, the fixed mold 20, the pressure piece 13, and the coating-material injector 50, and, in the example embodiment of the present invention shown in FIG. 6, the movable mold 10 is a female mold and the fixed mold 20 is a male mold.

The mold 100 has a structure in which the fixed mold 20 serving as a male mold and the movable mold 10 serving as a female mold are engaged with each other along a shear-structured engaging portion, the mold cavity 5 is formed between the two molds in a state in which they are engaged with each other, and the shear-structured engaging portion (sometimes, referred to as a shear portion) is formed along the circumference of the mold cavity 5. Thus, the mold 100 prevents a resin filled in the mold cavity 5 from leaking out from the shear portion of the mold 100.

As shown in FIG. 8, the fixed mold 20 serving as a male mold has a base platen 20A and a core platen 20B, and, by assembling the base platen 20A and the core platen 20B, a groove is formed along a part of the engaging portion so as to extend along the circumference of the mold cavity 5.

In an actual assembling step, the two platens are assembled and unified with each other while having the pressure piece 13, which will be described in detail later, sandwiched in the groove. Also, when the mold 100 has an auxiliary cavity formed therein, the pressure piece may be formed in a part of the auxiliary cavity.

Meanwhile, the base platen 20A has an inlet and an outlet of a heating medium disposed in the pressure piece 13, respectively for feeding and discharging a heating medium, and, when the two platens are unified with each other, the heating-medium inlet and outlet disposed in the base platen 20A are assembled so as to communicate respectively with an inlet and an outlet of the heating medium formed in the pressure piece 13, which will be described later.

An example of the pressure piece 13 will be described in detail below.

The pressure piece 13 has substantially the same shape as that of the foregoing groove and has at least one temperature-regulating element disposed therein, for regulating the temperature of the pressure piece 13.

Meanwhile, at least one heating-medium flowing path (two paths in the present embodiment) is formed in the pressure piece 13 according to the embodiment shown in FIG. 6 so as to allow a heating medium (oil in the present embodiment) to flow therein and to serve as the temperature-regulating element with which, by allowing a temperature-regulated heating medium to flow in the heating-medium flowing path, the pressure piece 13 is heated so as to regulate the temperature thereof.

Meanwhile, the temperature of the heating medium flowing in the heating-medium flowing path is regulated by a temperature regulator (not shown).

The structure of the pressure piece 13 will be described. The pressure piece 13 according to the embodiment shown in FIGS. 6 and 7 is formed such that prisms composed of a metal (a stainless steel in the present embodiment) are bonded to each other by welding so as to provide a rectangular frame shape, each prism forming the frame has cylindrical heating-medium flowing paths formed therein so as to extend along the longitudinal direction thereof, and, when the ends of the adjacent prisms are welded to each other in order to form the rectangular frame, the heating-medium flowing paths formed in the prisms are formed so as to communicate with each other through the corresponding prisms.

With this structure, the pressure piece 13 is formed at a mold temperature in forming (70° C. in the present embodiment) so as to have substantially the same shape as that of the foregoing groove shown in FIGS. 7(*a*) and 8, and in addition, by feeding a heating medium into the heating medium inlet (not shown) disposed in the pressure piece 13, the heating medium flows while making a round along the frame of the pressure piece 13 and is discharged through the heating medium outlet (not shown) disposed in the pressure piece 13 after regulating the temperature of the entire pressure piece 13.

Meanwhile, in the embodiment shown in FIGS. 6 and 7, two lines of heating-medium flowing paths are provided so that the temperature of the entire pressure piece 13 is quickly regulated so as to reach a desired temperature.

Although the number of the heating-medium flowing paths is two in the present embodiment, it may be singular or plural as long as at least one heating-medium flowing path is constructed so as to regulate the temperature of the pressure piece 13 for achieving its thermal expansion.

Meanwhile, the heating-medium flowing path is preferable for shortening a forming cycle since it can be used not only for heating the pressure piece 13 but also for cooling the pressure piece 13 by changing the temperature of a heating medium flowing therein.

Also, two lines of the heating-medium flowing paths for heating and cooling may be disposed. In this case, since a low-temperature heating medium is allowed to flow in the heating-medium flowing path for cooling immediately after forming, the pressure piece 13 can be more quickly cooled and the forming cycle can be further shortened, hence this case is more preferably than the case in which only the heating-medium for heating is provided.

Furthermore, the pressure piece 13 lying in a state in which a heating-medium having a lower temperature than a mold temperature in molding flows in the heating-medium flowing path may be formed so as to have substantially the same shape as that of the foregoing groove and may have a structure in which the pressure piece 13 is expanded by increasing its temperature with the mold temperature in forming by stopping the flowing of the heating medium.

Also, the temperature-regulating element formed in the pressure piece 13 is not limited to the heating-medium flowing path shown in FIGS. 6 and 7, and it may be the electrothermal heater H1 or a combination of the electrothermal heater H1 and the heating-medium flowing path.

Although the pressure piece 13 used in the embodiment in accordance with the second aspect of the present invention is composed of a stainless steel, it is not limited to the above material and the material of the pressure piece 13 may be a steel other than a stainless steel, an SC steel, a metal alloy, or a metal other than these metals as a matter of course, as long as the pressure piece 13 can seal a coating material so as not to leak from the shear portion due to its thermal expansion action, which will be described later.

Meanwhile, since it is preferable that the material of the pressure piece 13 have a lower degree of hardness than that forming the movable mold 10 in order avoid damage on the main body of the mold, the pressure piece 13 is preferably composed of a stainless steel, cupper, or the like, each having a relatively low degree of hardness.

Although the pressure piece 13 is formed so as to have a rectangular frame shape in the embodiment in accordance with the second aspect of the present invention since the shear portion has a rectangular shape due to the shape of a formed product, and the groove formed in the engaging portion has a frame shape having a rectangular cross section, the pressure piece 13 is not limited to the above shape; however, it must be formed so as to agree with the shape of the shear portion formed along the circumference of the divided surfaces of the mold cavity 5, for example, it is required to be circularly formed if the shape of the shear portion is circular.

Next, the coating-material injector 50 in the accordance with the second aspect of the present invention will be briefly described.

The coating-material injector 50 used in the embodiment in the accordance with the second aspect of the present invention has a basic structure which is not different from that of the coating-material injector used in the embodiment in the accordance with the first aspect of the present invention and is fixed to the movable mold 10 so as to inject a coating material into the mold cavity 5 through the coating-material inlet 51 disposed in the surface of the cavity 5 of the movable mold 10. Also, the coating-material inlet 51 of the coating-material injector 50 has a valve (not shown) fixed therein, and, when a base material is subjected to injection molding, the valve is closed so as to prevent a resin injected in the cavity 5 of the mold 100 from entering into the coating-material injector 50 through the coating-material inlet 51.

With this arrangement, the coating-material injector 50 in the present embodiment is driven by a driving apparatus (not shown) so as to accurately inject a desired amount of a coating material fed in the coating-material injector 50 through the surface of the cavity 5 of the movable mold 10.

Although the coating-material injector 50 in the present embodiment in accordance with the second aspect of the present invention is constructed so as to inject a coating material through the surface of the cavity 5 of the movable mold 10 as described above, it is not limited to the above structure. Since the coating-material injector 50 is sufficient as long as it is constructed so as inject a coating material into a clearance formed between a resin formed product formed in the mold cavity 5 and the surface of the mold cavity 5, it may be fixed to the fixed mold 20. Although the coating-material injector 50 in the present embodiment is singular, it is not limited to the above arrangement and may be plural.

An in-mold coat-forming method using the mold 100 in accordance with the second aspect of the present invention will be described in detail below with reference to FIGS. 11 and 9.

As a first step, the mold 100 is clamped by a mold-clamping apparatus (not shown). Then, a thermoplastic resin serving as a base material (an ABS resin UT 20B made by UBE CYCON Ltd. is used as the base material in the present embodiment) is injected into the mold, and the base material is cooled down to a certain extent (to an extent to which a formed product is not deformed even when the mold is opened).

FIG. 9(*a*) illustrates a state in which the resin is filled in the cavity 5 of the mold 100. In the embodiment shown in FIG. 9, the shear portion has a clearance of 0.5 mm, and the resin having entered into the shear portion has been solidified.

After the base material is cooled, a heating medium (oil in the present embodiment) heated to 180° C. is made to flow through the heating-medium flowing paths of the pressure piece 13 so as to expand the pressure piece 13.

The pressure piece 13 enters into the shear portion due to its expansion and generates a state of strongly pressing the resin (sometimes, referred to as a pressing state). Then, as shown in FIG. 9(*c*), in a state in which the mold is slightly opened (in the present embodiment, a state in which the movable mold 10 is moved by about 1 mm in the opening direction of the mold), a clearance is formed between a resin formed product formed in the mold cavity 5 and the surface of the mold cavity 5 of the movable mold 10.

After the clearance is formed, a coating material of 7 milliliters is injected into the clearance with the coating-material injector 50. Meanwhile, the coating material used in this embodiment in accordance with the second aspect of the present invention has the same components as those shown in Table 1.

Meanwhile, an operation of the method is basically the same as that in accordance with the first aspect, that is, after a coating material is injected into the clearance by using the coating-material injector 50, the movable mold 10 is moved towards the fixed mold 20, and the mold 100 is closed again and is then clamped, so as to cause the coating material in the clearance to flow while being pressed out in order to extend in every corner of the cavity 5 of the mold 100, and at the same time, to be kept in a state of having a pressure applied thereon.

Meanwhile, since the amount of the coating material injected from the coating-material injector 50 is 7 milliliters, and the area of a coating surface is 700 cm$^2$ (the area of the mold), a film with a thickness of about 0.100 mm is formed on the base material.

In this occasion, although the coating material tends to leak out from the clearance of the shear portion, as shown in FIG. 9(*c*), expansion of the pressure piece 13 causes the resin having entered into the shear portion to be strongly pressed, thereby preventing the coating material from leaking out from the clearance.

In the present embodiment, the clearance of the shear portion equal to 0.5 mm is formed, and the coating material is prevented from leaking out from the clearance by strongly pressing the resin having entered into the shear portion; however, the clearance smaller than 0.1 mm causes the resin unlikely to enter into the shear portion, and the clearance exceeding 1 mm causes a work for removing the resin which enters into the shear portion and then accretes on a formed product to be complicated.

Accordingly, the clearance preferably lies in the range from 0.1 mm to 1 mm.

By forming the clearance of the shear portion so as to lie in the range from 0.1 mm to 1 mm, the resin can reliably enter into the shear portion, and a method for preventing leakage of the coating material by pressing the resin having entered into the shear portion can be reliably carried out.

With the in-mold coat-forming method for preventing leakage of a coating material by pressing the resin having entered into the shear portion, even when the shear portion is worn away, the resin enters into the shear portion along the worn surface thereof and is solidified, thereby preventing leakage of the coating material without deteriorating its advantage in comparison with the case where the shear portion is not worn away. Thus, the method of sealing by pressing the resin having entered into the shear portion is especially preferable since it achieves a great effect when the clearance lies generally in the range from about 0.1 mm to about 1 mm.

In the meantime, the clearance of the shear portion (the shear-structured engaging portion) in the present invention is defined as the distance between the fixed mold 20 serving as a male mold and the movable mold 10 serving as a female mold, extending in the shear portion and perpendicular to the moving direction of the movable mold 10.

Also, although the present embodiment in which the groove is formed along the circumference of the mold cavity 5, and the pressure piece 13 is disposed along the circumference of the mold cavity 5 is preferable because of being especially highly effective in preventing leakage of the coating material, with the method for preventing leakage of the coating material by pressing the resin having entered into the shear portion, the groove and the pressure piece 13 are not needed to be disposed along the circumference of the mold cavity 5, and leakage of the coating material can be prevented by forming the groove in a part of the shear portion and by disposing the pressure piece 13 at key spots of the shear portion; hence the pressure piece 13 is not needed to be disposed along the circumference of the mold cavity 5.

Meanwhile, even in the case aiming at achieving an effect of the method, disclosed in JP-A-2001-138334 previously described in Background Art, for preventing leakage of a coating material by adjusting the size of the shear portion and by filling the coating material in the auxiliary cavity, when the structure of the in-mold coat-forming mold in accordance with the second aspect of the present invention is applied, the pressure piece 13 presses a resin having entered into the shear portion corresponding to the auxiliary cavity, thereby overcoming a problem of leakage of the coating material caused by molding shrinkage of the resin having entered into the shear portion, and thus providing a very preferable result.

After the coating material is injected, the heating medium heated to 70° C. is made to flow through the heating-medium flowing paths of the pressure piece 13 so as to shrink the pressure piece 13. Shrinkage of the pressure piece 13 gradually resolves a state of strongly pressing the resin having entered into the shear portion.

Then, the coating material is extended in every corner of the cavity of the mold 100 and, at the same time, is cured in a state of having a pressure applied thereon, and, after the coating material is cured, the mold is opened so as to take out a finished product therefrom.

Meanwhile, the coating material used in the present embodiment is thermosetting and is accordingly readily cured at a set mold temperature.

Also, as shown in FIGS. 10(a) or (c), when an electrothermal heater H3 is disposed on the surface, facing the pressure piece 13, of the movable mold 10 serving as a female mold, since an effect in that heat of the heater H3 accelerates the coating material leaking in the shear portion to be cured, and the coating material thus loses its fluidity in the shear portion to a large extent or is fully cured can be expected, this method is preferable because of being highly effective in preventing the coating material from leaking out of the mold 100.

Figure 12:
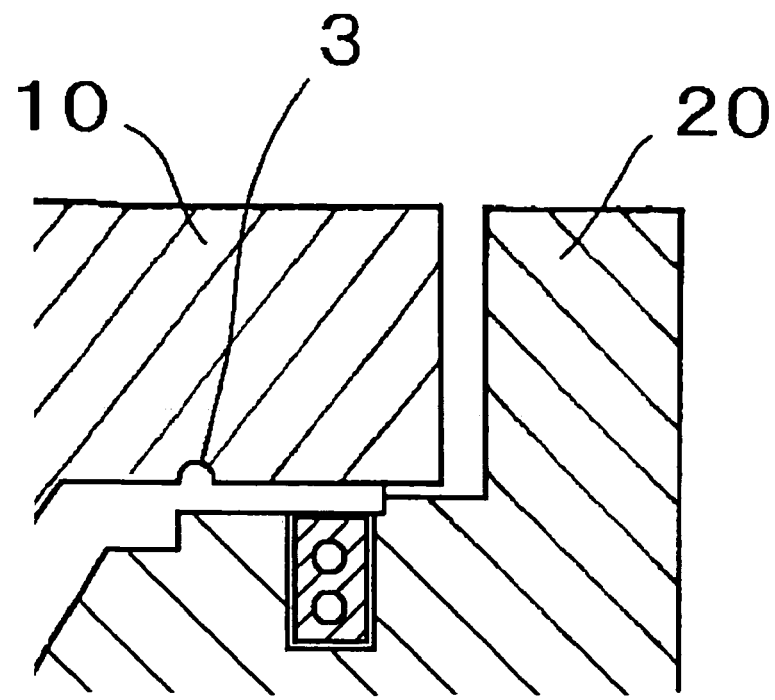
FIG. 12 is a sectional view in essential part illustrating the structure of an in-mold coat-forming mold in accordance with a third aspect of the present invention, in which a groove and a pressure piece serving as coating-material leakage-preventing means are disposed.

FIG. 12 is a sectional view in essential part illustrating an embodiment of a mold in accordance with a third aspect of the present invention. In accordance with this aspect, the groove serving as the coating-material leakage-preventing means in accordance with the first aspect and the pressure piece serving as the coating-material leakage-preventing means in accordance with the second aspect are disposed in combination. The pressure piece is generally disposed so as to lie below the groove. Such an arrangement allows a resin between the pressure piece 13 and the groove 3 to be deformable, thereby providing the mold 100 having both the foregoing working effect generated when the projection gets out of the groove in a state in which the mold is opened before a coating material is injected and the working effect of the pressure piece 13.

As a mater of course, molds having the following structures fall in the scope of the present invention.

That is, an in-mold coat-forming mold which includes a mold cavity formed by a male mold and a female mold; a shear-structured engaging portion; and a coating-material injector for applying a coating, in the mold cavity, on the surface of a resin formed product formed in the cavity and which is characterized in that an auxiliary cavity extending in the opening and closing directions of the mold is disposed along the circumference of the mold cavity, a groove is formed along the circumference of the surface of the auxiliary cavity to be coated, and a pressure piece having at least one temperature-regulating element disposed therein is disposed in at least a part of the engaging portion, and an in-mold coat-forming mold which includes a mold cavity formed by a male mold and a female mold; a shear-structured engaging portion; and a coating-material injector for applying a coating, in the mold cavity, on the surface of a resin formed product formed in the cavity and which is characterized in that, in addition to including an auxiliary cavity extending in the opening and closing directions of the mold and disposed along the circumference of the mold cavity, the mold further includes a groove formed along the circumference of the surface to be coated of the auxiliary cavity; and a pressure piece disposed in at least a part of the engaging portion thereof or means formed by a combination of the groove and the pressure piece, for preventing leakage of a coating material fall in the scope of the present invention.

In addition, those skilled in the art will appreciate that in-mold coat-forming methods using these molds are included in a part of modes of the present application.

Industrial Applicability

The in-mold coat-forming mold in accordance with the first aspect of the present invention has an excellent working effect in that, even when a resin filled in the auxiliary cavity shrinks due to its cooling and a slight clearance is thus formed between the mold and the resin, the resin filled in the groove forms a projection, and the projection thus seals the formed clearance, so that a coating material can be prevented from leaking from the clearance.

Since the in-mold coat-forming mold in accordance with the first aspect of the present invention effectively prevents leakage of a coating material, a problem in that the leaked coating material gets mixed in a finished product in the following forming and has an adverse affect thereon, a problem of damaging the mold, or the like is not induced, whereby stable in-mold coat-forming can be performed for the long term.

The in-mold coat-forming mold in accordance with the second aspect of the present invention exhibits an excellent working effect in that, when the pressure piece disposed in the groove formed in the engaging portion expands by heating with the temperature regulator, it abuts directly against the female mold or presses a resin having entered into the engaging portion, so that a coating material is prevented from leaking out of the mold from the engaging portion.

Accordingly, since a problem in that the leaked coating material gets mixed in a finished product in the following forming and has an adverse affect thereon, a problem of damaging the mold, or the like is not induced, stable in-mold coat-forming can be performed for the long term.

Also, by forming the clearance in the engaging portion so as to lie in the range from 0.1 mm to 1 mm, a resin can positively enter into the engaging portion so that leakage of a coating material can be effectively prevented by pressing the resin having entered into the engaging portion.

With the in-mold coat-forming method for preventing leakage of a coating material by pressing the resin having entered into the engaging portion, even when the shear portion is worn away, the resin enters into the shear portion along the worn surface thereof and is solidified, thereby maintaining an excellent preventive effect against leakage of the coating material equivalent to that in the case where the shear portion is not worn away, and thus performing a stable operation.

In addition, means such as at least one electrothermal heater or at least one heating-medium flowing path, both disposed in the pressure piece so as to serve as a temperature-regulating element achieves a preferable effect in a simple structure and less troubles. Especially, when the heating-medium flowing path is used, by regulating the temperature of a flowing heating medium, the pressure piece can be quickly heated or cooled, thereby offering an excellent working effect in shortening a molding cycle time.

Furthermore, the mold in accordance with the third aspect of the present invention having a combination of the above two components disposed therein more reliably prevents leakage of a coating material, thereby achieving an effect in that a stable molding operation can be continued for the ling term. That is, in this mode, both components provide a synergetic effect, whereby the mold can be stably used for the longer term.

The invention claimed is:

1. An in-mold coat forming mold: comprising a mold cavity, formed by a male mold and a female mold; a shear-structured engaging portion; and a coating material injector for applying a coating, in the mold cavity, on the surface of a resin formed product formed in the cavity, characterized in that the male mold and female mold are engaged with each other along the shear-structured engaging portion; a coating material leakage-preventing means is disposed in the vicinity of the edge of the mold cavity adjacent to the shear-structured engaging portion and the coating-material leakage-preventing means is a groove formed in the vicinity of the edge of the mold cavity and disposed adjacent to the shear-structured engaging portion so as to lie along the circumference of the cavity, the groove arranged such that upon formation of a resin formed product, a projection of resin of the resin formed product is formed and the projection prevents leakage of the coating material by pressing against the shear-structured engaging portion.

2. An in-mold coat-forming mold comprising a mold cavity formed by a male mold and a female mold; a shear-structured engaging portion; and a coating-material injector for applying a coating, in the mold cavity, on the surface of a resin formed product formed in the cavity, characterized in that coating-material leakage-preventing means is disposed in the vicinity of the edge of the mold cavity adjacent to the engaging portion; and the coating-material leakage-preventing means is a pressure piece disposed in the engaging portion and having at least one temperature-regulating element disposed therein.

3. The in-mold coat-forming mold according to claim 1, further comprising an auxiliary cavity extending in the opening and closing directions of the mold and disposed along the circumference of the edge of the mold cavity with the shear-structured engaging portion and the mold cavity communicated with each other and having the auxiliary cavity disposed therebetween.

4. An in-mold coat-forming mold, comprising: a mold cavity formed by a male mold and a female mold; a shear-structured engaging portion; and a coating-material injector for applying a coating, in the mold cavity, on the surface of a resin formed product in the cavity, characterized in that an auxiliary cavity extending in the opening and closing directions of the mold is disposed along the circumference of the mold cavity, a groove is formed along the circumference of the surface of the auxiliary cavity to be coated, and a pressure piece having at least one temperature-regulating element disposed therein is disposed in at least a part of the auxiliary cavity or the engaging portion.

5. An in-mold coat-forming mold, comprising: a mold cavity formed by a male mold and a female mold; a shear-structured engaging portion; and a coating material injector for applying a coating, in the mold cavity, on the surface of a resin formed product formed in the cavity, characterized in that, the male mold and female mold are engaged with each other along the shear-structured engaging portion; and in addition to comprising an auxiliary cavity extending in the opening and closing directions of the mold and disposed along the circumference of the mold cavity, with the shear-structured engaging portion and the mold cavity communicated with each other and having the auxiliary cavity disposed therebetween, the mold further comprises a groove formed along the circumference of the surface to be coated of the cavity; and a pressure piece disposed in at least a part of the auxiliary cavity or the engaging portion or means comprising a combination of the groove and the pressure piece, for preventing leakage of a coating material.

* * * * *